United States Patent Office 3,369,015
Patented Feb. 13, 1968

3,369,015
6,8 - DIDEOXY - 6 - (2,4 - DINITROANILINO) - D-ERYTHRO-D-GALACTO-ALDEHYDO - OCTOSE DITHIOACETALS
Herman Hoeksema, Cooper Township, Kalamazoo County, Mich., assignor to The Upjohn Company, Kalamazoo, Mich., a corporation of Delaware
No drawing. Continuation-in-part of application Ser. No. 359,489, Apr. 13, 1964. This application Jan. 25, 1965, Ser. No. 427,948
4 Claims. (Cl. 260—211)

ABSTRACT OF THE DISCLOSURE

Novel 6,8 - dideoxy-6-(2,4-dinitroanilino) - D - erythro-D-galacto-aldehydo-octose dithioacetals [N-2,4-dinitrophenyl)linocosamine mercaptal] are produced by reacting a lincosamine mercaptal wherein the alkyl group of the mercaptal has from 1 to 8 carbon atoms, inclusive, or benzyl or 2-thenyl, with 1-fluoro-2,4-dinitrobenzene. The novel products have antimicrobial activity, useful to spray tomato plants, e.g. against tomato blight (*Alternaria solani*), or to disinfect hospital rooms and equipment, or as intermediates for useful quaternary ammonium compounds (active compound in electro-cardiographic jellies).

This application is a continuation-in-part of application Ser. No. 359,489, filed Apr. 13, 1964, now abandoned.

The present invention relates to novel compounds and is more particularly concerned with N-(2,4-dinitrophenyl) lincosamine mercaptals [6,8 - dideoxy - 6 - (2,4-dinitroanilino)-D-erythro - D - galacto - aldehydo-octose dithioacetals] (III), the 7-methoxy derivatives thereof and a process for the production thereof.

The novel compounds of this invention and the process for the production thereof can be illustratively represented in the following manner:

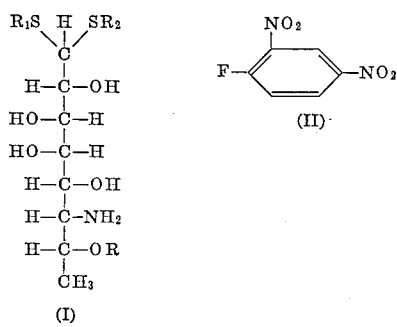

(I)

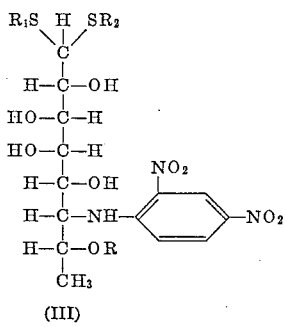

(III)

wherein R is selected from the group consisting of hydrogen and methyl, wherein $R_1$ and $R_2$ are selected from the group consisting of alkyl radicals having from 1 to 18 carbon atoms, inclusive, and benzyl and 2-thenyl.

The process of this invention comprises: reacting a lincosamine mercaptal (I, R=H) or a celestosamine mercaptal (I, $R=CH_3$) with 1-fluoro-2,4-dinitrobenzene (II) in a solution of a lower alcohol such as methanol, ethanol, 1-propanol, 2-propanol, 1-butanol, 2-butanol and the like, in the presence of a base capable of accepting hydrogen fluoride, such as sodium bicarbonate, potassium bicarbonate, lithium bicarbonate, and the like, and isolating the thus-obtained N-(2,4-dinitrophenyl)- lincosamine or celestosamine mercaptal (III).

The novel compounds, N-(2,4-dinitrophenyl) lincosamine mercaptals and N-(2,4-dinitrophenyl) celestosamine mercaptals, have activity against a number of microorganisms, particularly against *Rhodopseudomonas spheroides, Pischia chodati, Candida albicans, Microsporum canis, Trichophyton rubrum, Alternaria solani, Fusarium oxysporum*, and *Aspergillus flavus*. The antimicrobial activity of the novel compounds can be utilized for washing equipment in hospitals and homes, instruments used in surgery, equipment in laboratories specializing in the cultivation of microorganisms, and also for washing floors, walls and ceilings of rooms in which a sterile background is necessary due to the work performed in it. Inasmuch as the novel compounds are active against various plant pathogens, for example, *Alternaria solani*, which is responsible for tomato blight, the novel compounds can also be used in plant sprays to prevent diseases.

The novel compounds of Formula III can be converted to quaternary ammonium compounds, e.g., by treatment with an excess of an alkyl halide such as methyl iodide, ethyl iodide, butyl bromide, dodecyl iodide, hexadecyl bromide, propyl chloride, eicosyl iodide, or the like in the presence of sodium hydride in dimethylformamide. These quaternary salts which are highly active antimicrobial, electro-conductive wetting agents can be used in the preparation of electrocardiographic jellies. A suitable composition of an electrocardiographic jelly can be prepared as follows:

| | Parts |
|---|---|
| Glycerol | 5 |
| Starch | 10 |
| Quaternary ammonium salt | 60 |
| Water | 100 |

The jelly is prepared by mixing the starch, glycerol and water and then adding a selected alkyl halide addition salt of an N-(2,4-dinitrophenyl)-N-alkyl lincosamine mercaptal or of an N-(2,4-dinitrophenyl) - N - alkyl-celestosamine mercaptal.

The starting materials of Formula I of this invention are prepared by (1) reacting the antibiotics of Formulae IV, V or VI with a mercaptan or as shown further below by preparing synthetic antibiotics of Formula VII and reacting them with a mercaptan to obtain mercaptals of Formula VIII:

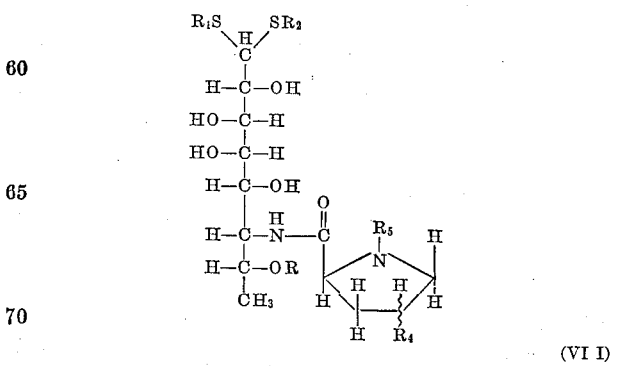

(VII)

wherein in R, $R_1$ and $R_2$ are defined as hereinabove, and wherein $R_4$ and $R_5$ are alkyl radicals having from 1 to 12 carbon atoms, inclusive, and (2) reacting these mercaptals (VIII) with hydrazine hydrate.

The antibiotics of Formulae IV, V and VI are:

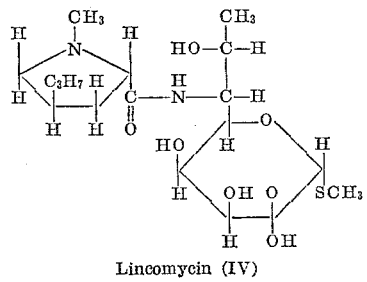

Lincomycin (IV)

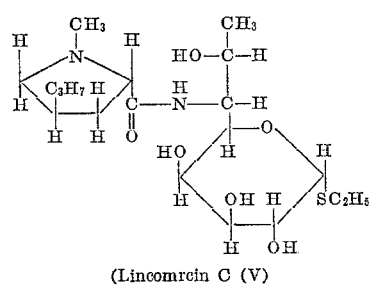

(Lincomrein C (V)

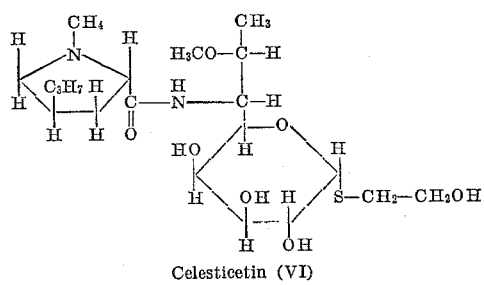

Celesticetin (VI)

Lincomycin (IV) is prepared by a fermentation process with *Streptomyces lincolnensis* var. *lincolnensis* as shown in U.S. Patent 3,086,912 and converted to its hydrochloride.

Celesticetin (VI) is prepared by a fermentation using *Streptomyces caelestis* as shown in U.S. Patent 2,928,844.

Lincomycin C (V) is prepared as shown in Preparation 1 below:

*Preparation 1.—Lincomycin C and its hydrochloride*

FERMENTATION

A solid slant of *Streptomyces lincolnensis* var. *lincolnensis*, NRRL 2936, was used to inoculate a series of 500-ml. Erlenmeyer flasks, each containing 100 ml. of seed medium consisting of the following ingredients:

| | |
|---|---|
| Yeastolac [1] | g 10 |
| Glucose monohydrate | g 10 |
| N-Z-amine B [2] | g 5 |
| Tap water q.s. | l 1 |

[1] Yeastolac is a protein hydrolysate of yeast cells.
[2] N-Z-amine B is Sheffield's enzymatic digest casein.

The seed medium presterilization pH was 7.3. The seed was grown for 2 days at 28° C. on a Gump rotary shaker operating at 250 r.p.m.

A 5% inoculum of the seed described above (5 ml.) was added to each of 30 500-ml. Erlenmeyer flasks each containing 100 ml. of the following fermentation medium:

| | |
|---|---|
| Glucose monohydrate | g 15 |
| Starch | g 40 |
| Molasses | g 20 |
| Wilson's Peptone Liquor No. 159[1] | g 10 |
| Corn steep liquor | g 20 |
| Calcium carbonate | g 8 |
| Lard oil | ml 0.5 |
| Tap water, q.s. | l 1 |

[1] Wilson's Peptone Liquor No. 159 is a preparation of enzymatically hydrolyzed proteins from animal origin.

At the time of inoculation, DL-ethionine was added to a final concentration of 2 mg./ml.

The shake flasks were harvested after 4 days of fermentation at 28° C. on a Gump rotary shaker at 250 r.p.m. They assayed 200 mcg./ml. on the *S. Lutea* assay, hereinafter described. The whole beer solids was about 20 g./liter.

In a similar manner, fermentations were run with L-ethionine substituted for DL-ethionine, and D-ethionine substituted for DL-ethionine.

PURIFICATION

Whole beer (235 l.) from a DL-ethionine fermentation was filtered at harvest pH using a filter aid as required. The mycelial cake was washed with water and the cake was then discarded. The filtered beer and water wash (275 l.) was stirred for 45 minutes with 12.5 kg. of activated carbon and 2.5 kg. of diatomaceous earth. The mixture was filtered and the filtrate was discarded. The carbon cake was washed with 60 l. of water and the water wash was discarded. The cake was washed with 70 l. of 20% aqueous acetone and the 20% aqueous acetone was discarded. The cake was then eluted twice with 100 l. portions of 90% aqueous acetone. The eluates were combined (215 l.) and the solution was concentrated (18 l.) This concentrate was adjusted to pH 10.0 with a 50% aqueous sodium hydroxide solution and extracted three times with 20 l. portions of methylene chloride. The methylene chloride extracts were combined (60 l.) and then concentrated to give an oily preparation (7.14 g.) containing lincomycin and lincomycin C in equal amounts and both in the free base form. This preparation was then dissolved in 200 ml. of methylene chloride. The solution was clarified by filtration and then concentrated to dryness in vacuo. The residue was dissolved in 100 ml. of 1 N methanolic hydrogen chloride. The methanolic solution was then mixed with 3.2 l. of ether under stirring. The resulting precipitated colorless, crude lincomycin hydrochloride and lincomycin C hydrochloride was isolated by filtration and dried; yield 7.14 g. assaying 940 mcg./mg. against *Sarcina lutea*. (The assay against *Sarcina lutea* is conducted on agar buffered to pH 6–8 with pH 7.0 phosphate buffer [0.1 M]. A unit volume [0.08 ml.] of solution containing the material to be assayed is placed on a 12.7 ml. assay disc which is then placed on an agar plate seeded with the assay microorganism.) Thin layer chromatography showed the presence of both lincomycin hydrochloride and lincomycin C hydrochloride in approximately equal amounts.

Crude lincomycin C hydrochloride (7.0 g.), as obtained in Preparation 1, was dissolved in 20 ml. of water and 20 ml. of butanol, pH adjusted to 4.2 with 1 N HCl, and the solution distributed in a counter current distribution apparatus for 1000 transfers. Analysis by thin layer chromatography showed that the fractions in tubes 135 to 190 contained lincomycin C. These fractions were combined, and the solution was concentrated and then freeze dried to give 2.44 g. of lincomycin C hydrochloride assaying 1400 mcg./mg. against *Sarcina lutea*. 500 mg. of this preparation was dissolved in 2 ml. of water, 1 ml. of methanol, and 100 ml. of acetone. The solution was clarified by filtration. The filtrate was mixed with ether until crystals appeared. The mixture was allowed to stand at room temperature for 1 hour. Crystalline (cubes) lincomycin C hydrochloride was separated from the supernatant material solution by decantation. These crystals were recrystallized from 1 ml. of water, 1 ml. of methanol, 80 ml. of actone and 20 ml. of ether; yield, 250 mg. of crystalline (cubes) lincomycin C hydrochloride. The supernatant (obtained as described above) was allowed to stand at 5° C. for 4 hours. Crystalline (needles) lincomycin C hydrochloride which precipitated was filtered and dried; yield, 150 mg. of crystalline (needles) lincomycin C hydrochloride.

The synthetic antibiotics of Formula VII:

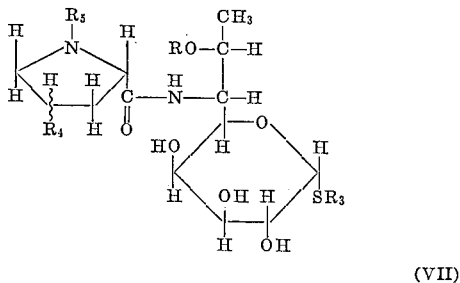

(VII)

wherein R, $R_4$ and $R_5$ have the significance of hereinbefore and $R_3$ is selected from the group consisting of methyl, ethyl and 2-hydroxyethyl, are prepared according to the following steps:

Step 1: synthesis of the amino sugar moiety from the fermentation products IV, V and VI;

Step 2: synthesis of 1,4-dialkylprolines;

Step 3: condensation of the amino sugar moiety with the dialkylprolines to give a synthetic antibiotic of Formula VII.

Treating a compound of Formulae IV, V, VI or VII with a mercaptan selected from the group of alkyl thiols wherein the alkyl group has from 1 to 18 carbon atoms, inclusive, benzyl mercaptan and 2-thenyl mercaptan, produces the starting materials of Formula I. The following preparations illustrate the production of these products.

(1) THE AMINO SUGARS

*Preparation 2.*—Methyl α-thiolincosaminide

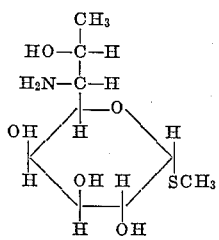

*Methyl 6-amino-6,8-dideoxy-1-thio-D-erythro-α-D-galacto-octopyranoside (Methyl α-thiolincosaminide)*

A solution of 40 g. of lincomycin (U.S. Patent 3,086,912) in 20 ml. of hydrazine hydrate (98–100%) was refluxed for 21 hours; excess hydrazine hydrate was then removed in vacuo under nitrogen at steam bath temperature, leaving a residue. The residue, a pasty mass of crystals, was cooled, acetonitrile was added, and the mixture was stirred until the crystals were suspended. The crystals were collected on a filter, washed with acetonitrile and with ether. The yield of white, crystalline methyl α-thiolincosaminide after drying in vacuo at room temperature was 21 g. (84%). Recrystallization was accomplished by dissolving methyl α-thiolincosaminide in hot dimethylformamide and adding an equal volume of ethylene glycol dimethyl ether.

Methyl α-thiolincosaminide has a melting point of 225–228° C., an optical rotation of $[\alpha]_D^{25}$ plus 276° (c.=.768, water) and a pKa' of 7.45.

*Analysis.*—Calculated for $C_9H_{19}NO_5S$: C, 42.7; H, 7.56; N, 5.53; S, 12.66. Found: C, 42.6; H, 7.49; N, 5.75; S, 12.38.

*Preparation 3.*—Ethyl α-thiolincosaminide

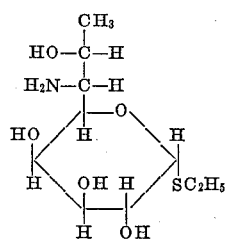

Lincomycin C hydrochloride (2 g.) was dissolved in 50 ml. of water. The pH of the solution was adjusted to 9.5 by the addition of an anion exchange resin in the hydroxide form. (An anion exchange resin obtained by chloromethylating by the procedure given on pp. 88 and 97 of Kunin, Ion Exchange Resins, 2nd Ed., [1958], John Wiley and Sons, Inc., polystyrene cross-linked, if desired, with divinylbenzene, prepared by the procedure given on p. 84 of Kunin, supra, and quaternizing with trimethylamine or dimethylethanolamine, by the procedure given on p. 97 of Kunin, supra.) The alkaline solution was then freeze dried to a residue which was dissolved in 50 ml. of hydrazine hydrate (98–100%) and refluxed for 24 hours. The solution was then concentrated to dryness in vacuo and the residue was stirred with three 10-ml. portions of acetonitrile. The insoluble material was collected and dried; yield 900 mg. A solution of 600 mg. of the dried insoluble material in 4 ml. of dimethylformamide (heat was used to promote solution) was then clarified by filtration and the filtrate was held at room temperature for 4 hours. The crystalline ethyl α-thiolincosaminide which precipitated was isolated by filtration, washed with ether and dried, yield 500 mg.

Ethyl α-thiolincosaminide has a melting point 191–195° C.; an optical rotation $[\alpha]_D^{25}$ plus 258° (c.=0.76, water); a pKa' of 7.17, and the following elemental analysis:

Calculated for $C_{10}H_{21}NO_5S$: C, 44.93; H, 7.92; N, 5.24; S, 11.99; O, 29.92. Found: C, 44.09; H, 7.91; N, 5.24; S, 11.32.

*Preparation 4.*—2-hydroxyethyl thiocelestosaminide

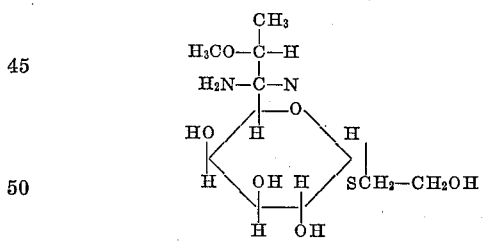

A mixture of 5 g. (0.0094 mole) of celesticetin (Example 3, U.S. Patent 2,928,844) and 25 ml. (excess) of hydrazine hydrate was heated under reflux for 21 hours. The excess hydrazine was removed by distillation in vacuo and the residue was crystallized from 35 ml. of absolute ethanol. White crystals (1.2 g.) of 2-hydroxyethyl thiocelestosaminide hydrazine solvate were obtained which melted at 98–108° C. Recrystallization from absolute ethanol gave 0.65 g. having an optical rotation of $[\alpha]_D^{25}$ plus 243° (c.=0.8, water); an infrared absorption spectrum in Nujol mull at the following frequencies: 3400, 1630, 1600, 1460, 1450 (sh), 1305, 1275, 1260, 1200, 1115, 1085, 1055, 1010, 978, 950, 925, 910, 873, 800, 820, 705, 690, and 680 cm.$^{-1}$; an equivalent weight of 161 with two basic groups having pKa's in the region of 7.5; and the following elemental analysis:

*Analysis.*—Calculated for $C_{11}H_{23}NO_6S \cdot N_2H_4$: C, 40.11; H, 8.26; N, 12.76; S, 9.74. Found: C, 40.15; H, 8.04; N, 11.69; S, 9.56.

A solution of 2 g. of 2-hydroxyethyl thiocelestosaminide hydrazine solvate in 30 ml. of dimethylformamide was concentrated to a volume of about 10 ml. and then diluted with 10 ml. of dimethylformamide. Ether was added until cloudiness resulted, and 500 mg. of 2-hydroxyethyl thiocelestosaminide was deposited. The crystalline 2-hydroxyethyl thiocelestosaminide had an optical rotation of $[\alpha]_D^{25}$ plus 262° (c.=1, water); an infrared absorption spectrum at the following frequencies: 3400 (sh), 3250, 1600, 1400, 1325, 1310, 1290, 1240, 1195, 1160, 1150 (sh), 1110, 1100, 1075, 1045, 1038, 1005, 980, 920, 895, 825, 796, 740, 711, and 690 cm.$^{-1}$; an equivalent weight of 297; a pKa' of 7.2; and the following elemental analysis:

*Analysis.*—Calculated for $C_{11}H_{23}NO_5S$: C, 44.43; H, 7.80; N, 4.71; S, 10.78. Found: C, 44.20; H, 7.78; N, 4.97; S, 10.68.

(2) SYNTHESIS OF 1,4-DIALKYLPROLINES

This synthesis can be carried out with known 4-ketoproline as starting material and schematically can be represented as follows:

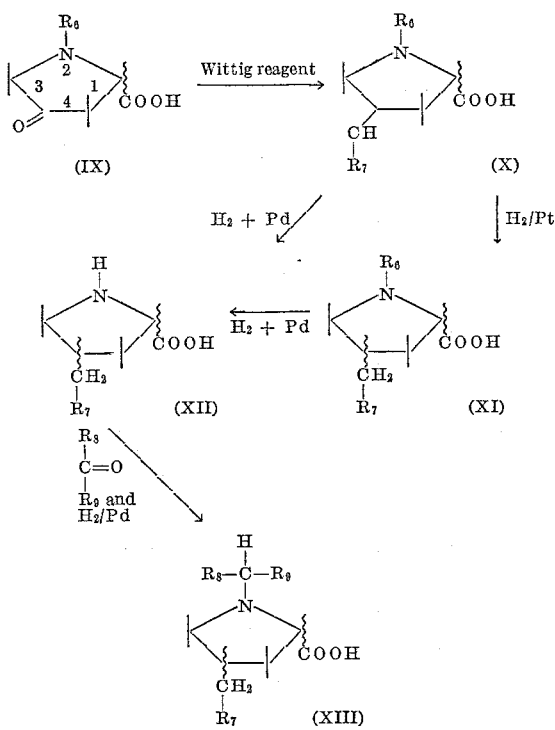

wherein $R_6$ is a protective hydrocarbyloxycarbonyl group which is removable by hydrogenolysis and wherein $R_7$ is selected from the group consisting of hydrogen and alkyl, in which the alkyl group contains from 1 to 11 carbon atoms, inclusive, and wherein $R_8$ and $R_9$ are selected from the group consisting of hydrogen and alkyl in which the groups contain together up to and including 12 carbon atoms.

The starting material can be an L- or D-proline and the 4-substituent which is introduced can be in the cis or trans position to the carboxyl group; the configurations at the 2- and 4-position are represented by wavy lines in the formulae.

The protective hydrocarbyloxycarbonyl groups, R, which are removable by hydrogenolysis, include particularly benzyloxycarbonyl groups of the formula:

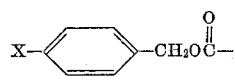

wherein X is selected from the group consisting of hydrogen, nitro, methoxy, chloro and bromo. Examples of such groups are carbobenzoxy, p-nitro-, p-chloro-, p-methoxy-, and p-bromobenzyloxycarbonyl. They also include phenyloxycarbonyl groups of the formula:

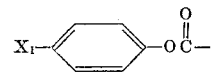

wherein $X_1$ is selected from the group consisting of hydrogen and alkyl containing from 1 to 4 carbon atoms, inclusive, such as phenyloxycarbonyl, p-tolyloxycarbonyl and p-ethylphenyloxycarbonyl; and allyloxycarbonyl and the like.

In addition, other substituents which are not hydrocarbyloxycarbonyl groups can be utilized as protective groups and removed by catalytic hydrogenolysis, e.g., triphenylmethyl, benzyl and p-nitrobenzyl.

This process comprises: treating a 1-hydrocarbyloxycarbonyl-4-ketoproline (X) with a Wittig reagent, usually an alkylidenetriphenylphosphorane [see, e.g., Wittig et al., Ber., 87, 1348 (1954); Trippett, Quarterly Reviews, XVII, No. 4, p. 406 (1963)] to obtain the corresponding 4-alkylidene-1-hydrocarbyloxycarbonylproline (X); hydrogenating the proline (X) in the presence of a platinum catalyst to obtain the corresponding 4-alkyl-1-hydrocarbyloxycarbonylproline (XI); hydrogenating compound XI in the presence of a palladium catalyst to obtain the corresponding 4-alkylproline (XII); treating compound XII with a carbonyl compound $R_8COR_9$ defined as above, and hydrogenating in the presence of a palladium catalyst to obtain the corresponding 1,4-dialkylproline XIII.

Alternatively, the 4-alkylidene-1-hydrocarbyloxycarbonylproline (X) can be hydrogenated in the presence of a palladium catalyst to give directly the 4-alkylproline of Formula XII.

Hydrogenation of compound X in the presence of a platinum catalyst gives significant amounts of both cis and trans isomers of structure XI. Hydrogenation of compound X in the presence of palladium, however, gives final products which are mostly the cis isomers with mere traces of the trans isomers. In either method the final products can be obtained in pure form by conversion of the resulting 1,4-dialkylprolines (XIII) to their amides, separating the amides chromatographically and hydrolyzing the separated amides to obtain the pure prolines.

*Preparation 5.—4-methylene-1-carbobenzoxy-L-proline and dicyclohexylamine salt thereof*

Sodamide was prepared in the usual manner from 1.29 g. (56 mmole) of sodium in 170 ml. of liquid ammonia. 20 g. (56 mmole) of methyltriphenylphosphonium bromide was added, the mixture was stirred at room temperature (24–26° C.) for 1 hour, and the ammonia was evaporated. To the residue was added 150 ml. of a mixture of equal amounts of ether and tetrahydrofuran. The mixture was heated at reflux for a period of 5–7 minutes, cooled to 26° C. and to it was added 2.63 g. (10 mmole) of 4-keto-1-carbobenzoxy-L-proline [Patchett et al., J. Am. Chem. Soc., 79, 185 (1957)] in 20 ml. of tetrahydrofuran. After heating the reaction mixture under reflux for 2.5 hours, the mixture was cooled, diluted with ether and aqueous sodium bicarbonate solution and filtered; the ether was discarded. The filtrate was acidified, extracted with ether and the extracts were evaporated to give 2.2 g. of crude 4-methylene-1-carbobenzoxy-L-proline.

The crude material (2.2 g.) was dissolved in ether and 1.8 ml. of dicyclohexylamine was added; 3.25 g. (74.4% yield) of 4-methylene-1-carbobenzoxy-L-proline dicyclohexylamine salt crystallized rapidly. The crystals after drying melted at 154–158° C.; rotation $[\alpha]_D$ plus 0.56° (c., 795, chloroform).

*Preparation 6.—Cis-4-methyl-L-proline*

A suspension of 20.9 g. of 4-methylene-1-carbobenzoxy-L-proline dicyclohexylamine salt in 308 ml. of 5% aqueous sodium hydroxide and 308 ml. of ether was shaken until all of the solid had dissolved. The layers were separated and each was backwashed with fresh solvent. The aqueous solutions were combined, acidified with dilute acid and extracted with ether. Evaporation of the solvent gave 4-methylene-1-carbobenzoxy-L-proline; yield, 12.1 g. (97.5%). This acid was dissolved in 250 ml. of methanol and hydrogenated over 2 g. of 10% palladium-on-carbon catalyst under 40 lbs. pressure of hydrogen for 2.5 hours. Filtration and evaporation of the reaction mixture gave cis-4-methyl-L-proline which was crystallized from methanol-ether; it melted at 231–233° C. Further recrystallization from acetonitrile gave pure cis-4-methyl-L-proline melting at 238–240° C.

*Analysis.*—Calculated for $C_6H_{11}NO_2$: C, 55.79; H, 8.59; N, 10.85. Found: C, 55.39; H, 8.42; N, 10.78.

*Preparation 7.—Cis-1,4-dimethyl-L-proline and the dicyclohexylamine salt thereof*

6 ml. of formalin and 1 g. of palladium-on-carbon catalyst (10% palladium) were added to the hydrogenated reaction mixture obtained in Preparation 6 and hydrogenation was continued for 2 hours. Thereafter the mixture was filtered to remove the catalyst and the solvent was removed by distillation. The resulting oily residue of 7.4 g. chiefly cis-1,4-dimethyl-L-proline, did not crystallize. It was dissolved in methanol and ether saturated with hydrogen chloride. Crystalline cis-1,4-dimethyl-L-proline hydrochloride precipitated; it was recovered by filtration and dried. The dried material had a melting point of 206 to 215° C. and after several recrystallizations from methanol and ether cis-1,4-dimethyl-L-proline hydrochloride of melting point 213–216° C. was obtained.

*Analysis.*—Calculated for $C_7H_{13}NO_2 \cdot HCl$: C, 46.80; H, 7.85; N, 7.80. Found: C, 47.54; H, 7.81; N, 8.00.

*Preparation 8.—4-propylidene-1-carbobenzoxy-L-proline and dicyclohexylamine salt*

Sodium hydride (3.8 g.) was warmed with 75 ml. of dimethyl-sulfoxide at a temperature of 70–75° C. until the reaction was complete. After cooling to 20° C., 30.8 g. of propyltriphenylphosphonium bromide was added, and the resulting red solution was stirred for 30 minutes to insure complete reaction. A solution of 5.2 g. of 4-keto-1-carbobenzoxy-L-proline in 15 ml. of dimethyl sulfoxide was added over a period of 15 minutes, and the resulting mixture was stirred for 20 minutes at 26° C. and then at 70° C. for 4 hours. The reaction mixture was cooled, 100 ml. of 5% aqueous potassium bicarbonate and 100 ml. of water were added, and the mixture was filtered. The filtrate was washed twice with 150 ml. portions of ether and the ether was discarded after back extracting with bicarbonate. The bicarbonate solutions were combined, diluted with 200 ml. of water, and acidified with 4 N hydrochloric acid. The acidified mixture was extracted with three 200-ml. portions of ether. The combined ether extracts were washed with three 50-ml. portions of saturated aqueous sodium bisulfite, then with water and dried over anhydrous sodium sulfate. Evaporation of the solvent gave 5.7 g. of a solid residue which was 4-propylidene-1-carbobenzoxy-L-proline.

This residue was dissolved in 18 ml. of acetonitrile and treated with 2.8 ml. of dicyclohexylamine. The crystalline dicyclohexylamine salt, 5.2 g. (55% yield), melted at 154–157° C. After three recrystallizations from acetonitrile, an analytical sample was obtained which melted at 164–166° C. and had a rotation of $[\alpha]_D$ minus 8° (c.=0.3898, $CHCl_3$).

*Analysis.*—Calculated for $C_{28}H_{42}N_2O_4$: C, 71.45; H, 9.00; N, 5.95. Found: C, 71.77; H, 9.39; N, 5.1.

*Preparation 9.—Cis-4-propyl-L-proline*

8 g. (17 mmoles) of the dicyclohexylamine salt of 4-propylidene-1-carbobenzoxy-L-proline was shaken with excess 1.5 N sodium hydroxide solution and ether until solution was complete. The layers were separated and each one was backwashed. The aqueous alkaline layer was combined with the backwash from the ether layer and acidified with 4 N hydrochloric acid. The mixture was extracted with ether and the ether extracts were combined and evaporated to give 4.8 g. (97.8%) of 4-propylidene-1-carbobenzoxy-L-proline as an oil. This oil was hydrogenated in 200 ml. of methanol over 1 g. of 10% palladium-on-charcoal catalyst for a period of 2 hours. Since the reaction appeared incomplete from thin layer chromatographic analysis, hydrogenation was continued for 2 hours after 0.5 g. of fresh catalyst had been added. The mixture was thereupon filtered and the filtrate was evaporated. The residue was crystallized from methanol-ether; melting point about 222° C. with decomposition. This product consisted of cis-4-propyl-L-proline with a trace of trans-4-propyl-L-proline.

*Preparation 10.—Cis-4-propyl-1-methyl-L-proline*

To the hydrogenation mixture from a hydrogenation conducted as in Preparation 9 was added 5 ml. of Formalin. The mixture was hydrogenated for 2.5 hours at 45 lbs. pressure of hydrogen in the presence of an additional ½ g. of 10% palladium-on-carbon catalyst. The mixture was cooled, filtered and the filtrate was evaporated to dryness. The residue was dissolved in methanol, converted to the hydrochloride by treatment of the methanol solution with ethereal hydrogen chloride solution and crystallized from methanol-ether to give 2.82 g. (80%) of cis-4-propyl-1-methyl-L-proline hydrochloride of melting point 201–206° C.; rotation $[\alpha]_D$ minus 60°

(c.=0.8344, $H_2O$).

*Analysis.*—Calculated for $C_9H_{17}NO_2 \cdot HCl$: C, 52.04; H, 8.73; N, 6.75. Found: C, 51.72; H, 8.96; N, 6.44.

This sample contained less than 2% of trans-4-propyl-1-methyl-L-proline.

Treating cis-4-propyl-1-methyl-L-proline hydrochloride in aqueous solution with silver oxide, removing the thus-formed silver chloride and excess silver oxide by filtration, and evaporating the filtrate gave cis-4-propyl-1-methyl-L-proline in the zwitterion form.

*Preparation 11.—1-ethyl-cis-4-propyl-L-proline*

In the manner given in Preparation 10, 5 ml. of acetaldehyde was added to a hydrogenation mixture from a hydrogenation as conducted in Preparation 9, and hydrogenation was continued in the presence of a palladium-on-charcoal catalyst to give 1-ethyl-cis-4-propyl-L-proline.

*Preparation 12.—1-propyl-cis-4-propyl-L-proline*

In the manner given in Preparation 10, 5 ml. of propionaldehyde was added to a hydrogenation mixture from a hydrogenation as conducted in Preparation 9, and hydrogenation was continued in the presence of a palladium-on-charcoal catalyst to give 1-propyl-cis-4-propyl-L-proline.

*Preparation 13.—1-butyl-cis-4-propyl-L-proline*

In the manner given in Preparation 10, 5 ml. of butyraldehyde was added to a hydrogenation mixture from a hydrogenation as conducted in Preparation 9, and hydrogenation was continued in the presence of palladium-on-charcoal catalyst to give 1-butyl-cis-4-propyl-L-proline.

*Preparation 14.—1-(1-pentylhexyl)-cis-4-propyl-L-proline*

In the manner given in Preparation 10, 5 ml. of dipentyl ketone was added to a hydrogenation mixture from a hydrogenation as conducted in Preparation 9, and hydrogenation was continued in the presence of a palladium-on-charcoal catalyst to give 1-(1-pentylhexyl)-cis-4-propyl-L-proline.

Preparation 15.—Cis-4-propyl-1-methyl-L-prolinamide and trans-4-propyl-1-methyl-L-prolinamide A mixture of 3.09 g. (15 mmoles) of cis-4-propyl-1-methyl-L-proline containing a small quantity of trans-4-propyl-1-methyl-L-proline, 9.5 ml. of tributylamine, 100 ml. of acetonitrile and 40 ml. of acetone was stirred until complete solution had taken place. To this solution, cooled to 10° C., was added 2.05 ml. of isobutyl chloroformate. The reaction mixture was stirred for 30 minutes in the ice bath after which time 15 ml. of ammonium hydroxide was added and stirring was continued for 2 hours at room temperature. The mixture was distilled in vacuo until a residue was obtained, which was acidified with hydrochloric acid and extracted with ether. The ether extracts were discarded. The acidified aqueous fraction was made alkaline with sodium hydroxide and extracted with methylene chloride. The methylene chloride extract was chromatographed over silica gel (500 g.) using aqueous 80% acetone as the eluant and taking 15 ml. fractions. The fractions consisting of almost pure cis-4-propyl-1-methyl-L-prolinamide as shown by thin layer chromatography and fractions of a mixture of cis-4-propyl-1-methyl-L-prolinamide together with trans-4-propyl-1-methyl-L-prolinamide were obtained. The latter fractions were rechromatographed to yield a small amount of fairly pure trans-4-propyl-1-methyl-L-prolinamide and a larger amount of mixtures of trans-4-propyl-1-methyl-L-prolinamide and cis-4-propyl-1-methyl-L-prolinamide. The mixtures were again rechromatographed and the fractions containing almost pure trans-4-propyl-1-methyl-L-prolinamide were combined with the prior fraction containing the almost pure trans isomer. These fractions were thereupon recrystallized from SKellysolve B to give 10 mg. of trans-4-propyl-1-methyl-L-prolinamide, about 85% pure on the basis of thin layer chromatography; rotation $[\alpha]_D^{25}$ minus 91° (c., 0.833, H$_2$O).

The fractions containing the almost pure cis-4-propyl-1-methyl-L-prolinamide were recrystallized from ethyl acetate-Skellysolve B to give pure cis-4-propyl-1-methyl-L-prolinamide of melting point 113.5–115.5° C. and rotation $[\alpha]_D$ minus 89° (c., 0.841, H$_2$O).

*Analysis.*—Calcd. for C$_9$H$_{18}$NO$_2$: C, 63.49; H, 10.66; N, 16.46. Found: C, 63.41; H, 10.76; N, 16.28.

Preparation 16.—Cis-4-propyl-1-methyl-L-proline hydrochloride from cis-4-propyl-1-methyl-L-prolinamide Cis-4-propyl-1-methyl-L-prolinamide (400 mg.) was heated with 22 ml. of 20% hydrochloric acid under reflux for a period 4 hours. The reaction mixture was then cooled, evaporated to dryness in vacuo, and the residue was slurried with a small amount of warm ethanol and filtered to remove ammonium chloride. Ether was added to the filtrate and after cooling a white solid separated. After four recrystallizations from ethanol, cis-4-propyl-1-methyl-L-proline hydrochloride was obtained which, as in Preparation 10, could be converted to cis-4-propyl-1-methyl-L-prolyl by treatment with silver oxide.

Preparation 17.—Trans-4-propyl-1-methyl-L-proline hydrochloride

In the manner given in Preparation 16, trans-4-propyl-1-methyl-L-prolinamide was hydrolyzed with hydrochloric acid to give trans-4-propyl-1-methyl-L-proline hydrochloride.

Preparation 18.—Cis-4-propyl-1-methyl-L-proline and trans-4-propyl-1-methyl-L-proline 5 g. of 4-propylidene-1-carbobenzoxy-L-proline in 200 ml. of methanol was hydrogenated over 1 g. of a 7% platinum-on-Dowex 1 catalyst (40 lbs. H$_2$). (Dowex 1 is a strongly basic anion exchange resin produced by copolymerization of substituted styrenes and divinylbenzene.) After three hours of hydrogenation, 5 ml. of formalin and 1 g. of 10% palladium-on-charcoal catalyst was added and the hydrogenation was continued for 2½ hours at 45 lbs. pressure. The catalysts were then removed by filtration and the solvent was removed by distillation. The residue was dissolved in methanol, converted to the hydrochloride as in Preparation 10, and several times recrystallized from methanol-ether to give a mixture of the hydrochlorides of cis-4-propyl-1-methyl-L-proline and trans-4-propyl-1-methyl-4-proline, the latter in about 30% yield.

In the manner shown in Preparation 15, this mixture was separated by converting the 1-methylprolines into the amides and treating, as in Preparation 16, the mixture of amides to obtain pure cis-4-propyl-1-methyl-L-proline and pure trans-4-propyl-1-methyl-L-proline.

In the manner given in Preparation 18, other 1,4-dialkylprolines can be produced, such as trans-4-methyl-1-methyl-L-proline, trans - 4 - ethyl-1-methyl-L-proline, trans-4-butyl-1-methyl-L-proline, trans-4-pentyl-1-methyl-L-proline, trans-4-heptyl - 1 - methyl-L-proline, trans-4-octyl-1-methyl-L-proline, trans - 4 - decyl-1-methyl-L-proline, trans-4-dodecyl-1-methyl-L-proline, trans-4-butyl-1-octyl-L-proline, trans-4-hexyl-1-dodecyl-L-proline, trans-4-dodecyl-1-ethyl-L-proline, trans-4-undecyl-1-(1-propylpentyl)-L-proline, cis-4-butyl - 1 - ethyl-L-proline, cis-4-butyl-1-propyl-L-proline, cis-4-pentyl-1-propyl-L-proline, cis-4-hexyl-1-butyl-L - proline, cis - 4 - heptyl-1-pentyl-L-proline, cis-4-decyl-1-(1-butylpentyl)-L-proline, cis-4-dodecyl-1-(1-pentylheptyl)-L-proline, and the like.

The above methods are furthermore applicable for the preparation of the 1,4-dialkyl-D-prolines using as starting material 4-keto-D-proline and protecting the proline nitrogen by a protective hydrocarbyloxycarbonyl group as shown by Formulae IX through XIII. Representative 1,4-dialkyl - D - prolines thus obtained include: trans - 4 - propyl-1-methyl-D-proline, trans - 4 - butyl-1-ethyl - D - proline, cis-4-propyl-1-methyl-D-proline, cis-4-hexyl-1-butyl-D-proline, trans-4-dodecycl-1-decyl-D-proline, cis-4-decyl-1-hexyl-D-proline, and the like.

(3) THE CONDENSATION OF THE AMINO SUGAR WITH A 1,4-DIALKYLPROLINE

The condensation of the amino sugar with a selected 1,4-dialkylproline is generally carried out by reacting the 1,4-dialkylproline, dissolved in acetonitrile containing a trialkylamine, with isobutyl chloroformate and subsequently the amino sugar. The details of this reaction are illustrated by the following preparations.

Preparation 19.—Methyl-N-(cis-4-hexyl-1-methyl-L-prolyl)-α-thiolincosaminide hydrochloride A mixture of 2.47 g. (12 mmoles) of cis-4-hexyl-1-methyl-L-prolyl hydrochloride and 7.6 ml. (16 mmoles) of tributylamine in 80 ml. of distilled acetonitrile was stirred until all of the solid had dissolved. The solution was cooled in an ice bath and 1.54 g. (12 mmoles) of isobutyl chloroformate was slowly added. After 1 hour a solution of 3 g. of methyl α-thiolincosaminide (12 mmoles) in 60 ml. of water was added. The reaction mixture was stirred for 1 hour in the ice bath and then 3 hours at 26° C. The acetonitrile was removed in vacuo and the residue thus obtained was diluted with 20 ml. of water and twice extracted with ether. The aqueous solution was lyophilized. The residue was dissolved in methanol, chloroform was added, and the solution was washed twice with water. The aqueous washings from above were lyophilized and dried at 50° C. under vacuum. The residue was leached several times with chloroform and the chloroform solution was chromatographed over 200 g. of Florisil, a synthetic magnesium silicate, collecting fractions of 375 ml. and using a gradient elution system composed of 3.2 1. of Skellysolve B hexanes and 0.8 1. of ethyl acetate in Reservoir A and a solution of 0.8 1. methanol and 2.56 1. with Skellysolve B hexanes-0.64 1. ethyl acetate in Reservoir B. The fractions which showed material in the lincomycin area by thin layer chromatography were combined and evaporated to give a residue. This residue was dissolved in dilute hydrochloric acid. Adding acetone to the solution precipitated crude methyl N-(cis-4-hexyl-1-methyl-L-prolyl)-α-thiolincosaminide hydrochloride, having the following formula:

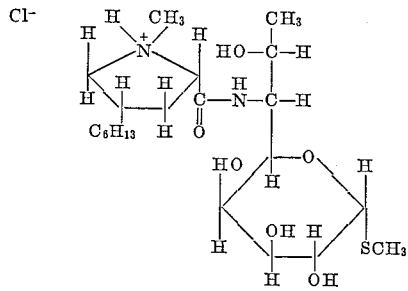

2 g. of methyl N-(cis-4-hexyl-1-methyl-L-prolyl)-α-thiolincosaminide hydrochloride, dissolved in 100 ml. of water, was treated with 2 g. of silver carbonate. The mixture was then extracted three times with butanol. The combined extracts were distilled in vacuo to give a residue which was dissolved in ethanol. The solution was treated with 1 g. of activated charcoal and filtered. The filtrate was evaporated to dryness and the residue was crystallized and twice recrystallized from ethanol to give methyl N-(cis-4-hexyl-1-methyl-L-prolyl)-α-thiolincosaminide.

*Preparation 20.—Methyl* N-*(trans-4-butyl-1-methyl-L-prolyl)-α-thiolincosaminide and hydrochloride thereof*

To a solution of 6.3 g. of trans-4-butyl-1-methyl-L-proline in 175 ml. of distilled acetonitrile cooled to 0° there was added 3.46 ml. of triethylamine followed by 3.34 ml. of isobutyl-chloroformate. The mixture was stirred at 0° C. (± 3°) for 15 min. A solution of 6.2 g. of methyl α-thiolincosaminide in 85 ml. of water was added, and the reaction mixture was stirred at 0° C. for 0.5 hour and at 25° C. for 1 hour. The reaction product was then filtered and dried, yielding methyl N-(trans-4-butyl-1-methyl-L-prolyl)-α-thiolincosaminide. The thus-obtained product was treated with sufficient dilute hydrochloric acid to dissolve it, and the thus-obtained hydrochloride was precipitated by the addition of acetone. Repeating this procedure gave pure methyl N-trans-4-butyl-1-methyl-L-prolyl)-α-thiolincosaminide hydrochloride melting at 139–141° C.

In the manner given in Preparation 20, the corresponding cis-epimer, methyl N-(cis-4-butyl-1-methyl-L-prolyl)-α-thiolincosaminide hydrochloride was prepared in a crystalline, solvated (4.95% water) form having a softening point of 108° C. and melting at about 189° C.

In the manner given in Preparation 19, other alkyl N-(1,4-dialkylprolyl)-α-thiolincosaminides and 2-hydroxyethyl N-(1,4-dialkylprolyl)-α-thiocelestosaminides are prepared by reacting selected 1,4-dialkylprolines dissolved in acetonitrile containing triethylamine with isobutyl chloroformate and then with methyl or ethyl α-thiolincosaminide or 2-(hydroxyethyl) 7-methoxy-α-thiolincosaminide (2-hydroxyethyl α-thiocelestosaminide). Representative compounds thus obtained include:

methyl N-(trans-4-methyl-1-methyl-L-prolyl)-α-thiolincosaminide,
methyl N-(trans-4-ethyl-1-methyl-L-prolyl)-α-thiolincosaminide,
methyl N-(trans-4-propyl-1-butyl-L-prolyl)-α-thiolincosaminide,
methyl N-(trans-4-octyl-1-ethyl-L-prolyl)-α-thiolincosaminide,
methyl N-(trans-4-decyl-1-butyl-L-prolyl)-α-thiolincosaminide,
methyl N-(trans-4-undecyl-1-hexyl-L-prolyl)-α-thiolincosaminide,
methyl N-(trans-4-dodecyl-1-isopropyl-L-prolyl)-α-thiolincosaminide,
methyl N-(cis-4-methyl-1-octyl-L-prolyl)-α-thiolincosaminide,
methyl N-(cis-4-propyl-1-ethyl-L-prolyl)-α-thiolincosaminide,
methyl N-(cis-4-hexyl-1-dodecyl-L-prolyl)-α-thiolincosaminide,
methyl N-(cis-4-pentyl-1-nonyl-L-prolyl)-α-thiolincosaminide,
methyl N-(cis-4-ethyl-1-undecyl-L-prolyl)-α-thiolincosaminide,
methyl N-(trans-4-pentyl-1-decyl-D-prolyl)-α-thiolincosaminide,
methyl N-(trans-4-propyl-1-methyl-D-prolyl)-α-thiolincosaminide,
methyl N-(trans-4-ethyl-1-propyl-D-prolyl)-α-thiolincosaminide,
methyl N-(trans-4-hexyl-1-dodecyl-D-prolyl)-α-thiolincosaminide,
methyl N-(cis-4-methyl-1-octyl-D-prolyl)-α-thiolincosaminide,
methyl N-(cis-4-octyl-1-methyl-D-prolyl)-α-thiolincosaminide,
methyl N-(cis-4-decyl-1-ethyl-D-prolyl)-α-thiolincosaminide,
ethyl N-(trans-4-ethyl-1-methyl-L-prolyl)-α-thiolincosaminide,
ethyl N-(trans-4-propyl-1-methyl-L-prolyl)-α-thiolincosaminide,
ethyl N-(trans-4-butyl-1-ethyl-L-prolyl)-α-thiolincosaminide,
ethyl N-(trans-4-hexyl-1-octyl-L-prolyl)-α-thiolincosaminide,
ethyl N-(trans-4-dodecyl-1-methyl-L-prolyl)-α-thiolincosaminide,
ethyl N-(cis-4-methyl-1-methyl-L-prolyl)-α-thiolincosaminide,
ethyl N-(cis-4-propyl-1-ethyl-L-prolyl)-α-thiolincosaminide,
ethyl N-(cis-4-butyl-1-methyl-L-prolyl)-α-thiolincosaminide,
ethyl N-(cis-4-pentyl-1-ethyl-L-prolyl)-α-thiolincosaminide,
ethyl N-(cis-4-hexyl-1-propyl-L-prolyl)-α-thiolincosaminide,
ethyl N-(cis-4-heptyl-1-propyl-L-prolyl)-α-thiolincosaminide,
ethyl N-(cis-4-octyl-1-propyl-L-prolyl)-α-thiolincosaminide,
ethyl N-(cis-4-dodecyl-1-hexyl-L-prolyl)-α-thiolincosaminide,
ethyl N-(cis-4-dodecyl-1-methyl-D-prolyl)-α-thiolincosaminide,
ethyl N-(cis-4-methyl-1-decyl-D-prolyl)-α-thiolincosaminide,
ethyl N-(cis-4-propyl-1-octyl-D-prolyl)-α-thiolincosaminide,
ethyl N-(cis-4-octyl-1-propyl-D-prolyl)-α-thiolincosaminide,
ethyl N-(cis-4-butyl-1-hexyl-D-prolyl)-α-thiolincosaminide,
ethyl N-(cis-4-nonyl-1-heptyl-D-prolyl)-α-thiolincosaminide,
ethyl N-(trans-4-methyl-1-ethyl-D-prolyl)-α-thiolincosaminide,
ethyl N-(trans-4-ethyl-1-methyl-D-prolyl)-α-thiolincosaminide,
ethyl N-(trans-4-propyl-1-decyl-D-prolyl)-α-thiolincosaminide,
ethyl N-(trans-4-butyl-1-nonyl-D-prolyl)-α-thiolincosaminide,
ethyl N-(trans-4-hexyl-1-octyl-D-prolyl)-α-thiolincosaminide,
ethyl N-(trans-4-decyl-1-dodecyl-D-prolyl)-α-thiolincosaminide,
ethyl N-(trans-4-dodecyl-1-undecyl-D-prolyl)-α-thiolincosaminide, 2 - hydroxyethyl N - (trans-4-propyl-1-ethyl-L-prolyl)-α-thiocelestosaminide, 2-hydroxyethyl N-(trans-4-butyl-1-ethyl-L-prolyl)-α-thiocelestosaminide, 2 - hydroxyethyl N-(trans-4-pentyl-1-methyl-L-prolyl)-α-thiocelestosaminide, 2 - hydroxyethyl N-(trans-4-hexyl-1-propyl-L-propyl)-α-thiocelestosaminide, 2-hydroxyethyl N-(trans-4-octyl-1-decyl-L-prolyl)-α-thiocelestosaminide, 2 - hydroxyethyl N-(trans-4-decyl-1-methyl-L-prolyl)-α-thiocelestosaminide, 2 - hydroxyethyl N - (trans-4-dodecyl-1-ethyl-L-prolyl)-α-thiocelestosaminide, 2 - hydroxyethyl N-(trans-4-methyl-1-ethyl-L-prolyl)-α-thiocelestosaminide, 2-hydroxyethyl N-(cis-4-ethyl-1-methyl-L-prolyl)-α-thiocelestosaminide, 2-hydroxyethyl N-(cis-4-propyl-1-methyl-L-prolyl)-α-thiocelestosaminide, 2-hydroxyethyl N-(cis-4-butyl-1-methyl-L-prolyl)-α-thiocelestosaminide, 2-hydroxyethyl N-(cis-4-hexyl-1-dodecyl-L-prolyl)-α-thiocelestosaminide, 2 - hydroxyethyl N - (cis-4-octyl-1-butyl-L-prolyl)-α-thiocelestosaminide, 2 - hydroxyethyl N - (trans-4-propyl-1-ethyl-D-prolyl)-α-thiocelestosaminide, 2-hydroxyethyl N-(trans-4-propyl-1-methyl-D-prolyl)-α-thiocelestosaminide, 2-hydroxyethyl N-(trans-4-hexyl-1-octyl-D-prolyl)-α-thiocelestosaminide, 2 - hydroxyethyl N - (trans-4-heptyl-1-hexyl-D-prolyl)-α-thiocelestosaminide, 2-hydroxyethyl N-(trans-4-decyl-1-nonyl-D-prolyl)-α-thiocelestosaminide, 2-hydroxyethyl N-(trans-4-undecyl-1-propyl-D-prolyl)-α-thiocelestosaminide, 2 - hydroxyethyl N-(trans-4-dodecyl-1-ethyl-D-prolyl)-α-thiocelestosaminide, 2 - hydroxyethyl N - (cis-4-propyl-1-methyl-D-prolyl)-α-thiocelestosaminide, 2-hydroxyethyl N-(cis-4-butyl-1-methyl-D-prolyl)-α-thiocelestosaminide, 2-hydroxyethyl N-(cis-4-pentyl-1-ethyl-D-prolyl)-α-thiocelestosaminide, 2-hydroxyethyl N-(cis-4-hexyl-1-undecyl-D-prolyl)-α-thiocelestosaminide, 2 - hydroxyethyl N - (cis-4-heptyl-1-dodecyl-D-prolyl)-α-thiocelestosaminide, 2-hydroxyethyl N-(cis-4-decyl-1-methyl-D-prolyl)-α-thiocelestosaminide, 2-hydroxyethyl N-(cis-4-dodecyl-1-ethyl-D-prolyl)-α-thiocelestosaminide, and the like.

THE SYNTHESIS OF MERCAPTALS OF FORMULA I

*Preparation 21.*—N-(trans-4-propyl-1-methyl-L-prolyl)lincosamine dimethyl mercaptal

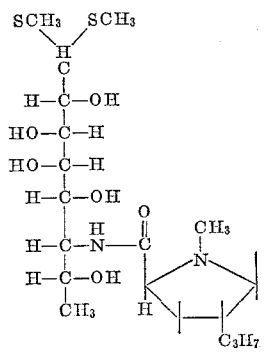

In a 1 liter, 3-necked flask equipped with a Dry Ice condenser, 150 ml. of concentrated hydrochloric acid and 80 ml. of methanethiol were chilled to 0° C. After rapid addition of 15 g. of lincomycin C hydrochloride (Preparation 1), the mixture was rapidly stirred for 5 hours, diluted with 1 volume of ice water and extracted with two 100-ml. portions of pentane. The extract was discarded. The hydrochloric acid solution was partially neutralized by addition of 100 g. of potassium hydroxide pellets at about 25° C. (Dry Ice-acetone cooling permitted rapid addition). The potassium chloride was removed by filtration. Chloroform (200 ml.) was added to the filtrate, which was then adjusted to pH 10 by the addition of 2 N aqueous sodium hydroxide solution and extracted with the chloroform. After a second extraction with chloroform, the chloroform extracts were combined and washed with three 50-ml. portions of water, a procedure which resulted in an emulsion. The extracts containing water were evaporated in vacuo, thus transferring the desired product to the aqueous phase which was then freeze dried. The freeze-dried product was crystallized from 75 ml. of boiling acetone to give 7.5 g. of product melting at 134–140° C. After a second crystallization from acetone, N-(trans-4-propyl-1-methyl-L-prolyl)lincosamine dimethyl mercaptal was obtained; M.P. 146–148° C., optical rotation $[\alpha]_D^{25}$=minus 33° (c.=1, methylene chloride).

*Analysis.*—Calculated for $C_{19}H_{38}N_2O_6S_2$: C, 50.19; H, 8.42; N, 6.16; O, 21.12; S, 14.10. Found: C, 50.15; H, 8.20; N, 6.16; S, 14.31.

*Preparation 22.*—N-(trans-4-propyl-1-methyl-L-prolyl)-lincosamine diethyl mercaptal In a 1 liter, 3-necked flask were placed concentrated hydrochloric acid (150 ml.) and 50 ml. of ethanethiol, previously cooled to 0° C. To this mixture was added 15 g. of lincomycin hydrochloride. After stirring magnetically at room temperature for a period of 5 hours, the reaction mixture was diluted with an equal volume of ice water, and the solution was extracted three times with Skellysolve B hexanes. The Skellysolve B hexane extracts were discarded.

The majority of the acid was then neutralized by the careful addition of solid potassium hydroxide (about 100 g.) while keeping the temperature of the well-stirred reaction mixture between 20 and 30° by cooling in an acetone-Dry Ice mixture. The thus-formed solid potassium chloride was removed by filtration and the solid was washed well with chloroform. The chloroform washings and additional chloroform were added to the filtrate (a total of about 150 ml.) and the mixture, while magnetically stirred, was adjusted to pH 10 by the addition of 2 N aqueous sodium hydroxide. The chloroform layer was separated and the aqueous layer extracted thoroughly with chloroform. The chloroform extracts were combined, washed twice with water, and dried over anhydrous sodium sulfate. The dried solution was evaporated at 30° in vacuo to give a semisolid residue which was recrystallized three times from acetone to give colorless, flattened needles of melting point 130–132°. A total yield of 6.91 g., 42.4%, of N-(trans-4-propyl-1-methyl-L-prolyl)lincosamine diethyl mercaptal was obtained.

*Analysis.*—Calcd. for $C_{21}H_{42}N_2O_6S_2$: C, 52.25; H, 8.77; N, 5.81; S, 13.29%. Found: C, 52.38; H, 8.71; N, 5.93; S, 13.46%.

*Preparation 23.*—N - (trans - 4 - propyl - 1 - methyl - L-prolyl)lincosamine dibutyl mercaptal and a mixture of N - (trans - 4 - propyl - 1 - methyl - L - prolyl)incosamine butyl methyl mercaptals To a slurried mixture of 167 ml. of concentrated hydrochloric acid and 100 g. of butanethiol (1.1 moles) at 0° C. was added 17 g. (0.0384 mole) of lincomycin hydrochloride. After stirring vigorously for 5 hours at 10°, 160 ml. of ice water was added and the reaction mixture was extracted three times with 200 ml. portions of Skellysolve B hexanes. The Skellysolve B hexane fractions were discarded. The aqueous phase was cooled and potassium hydroxide pellets were added while keeping the temperature at 10–20°. The thus-obtained potassium chloride was removed by filtration. The filter cake of potassium chloride was washed twice, each time with 200 ml. of chloroform, and the chloroform washings were added to the filtrate. The reaction mixture was adjusted to pH 10 by adding sufficient to N sodium hydroxide solution, about 110 ml. The chloroform layer was separated and the water layer extracted twice with 200 ml. of chloroform. The chloroform layer and extracts were combined, washed 3 times with 100 ml. portions of saturated sodium chloride solution. The chloroform phase was then filtered and evaporated in vacuo to give 11.5 g. of white solid. This was dissolved at room temperature in a mixture of methanol (1 part) and chloroform (9 parts) by volume. The solution was chromatographed over 800 g. of silica gel, taking fractions of 50 ml. each. The first 800 ml. of a forerun was discarded and on the basis of thin layer chromatography data the following fractions were combined:

Fractions 14–16, inclusive, (A); Fractions 19–23, inclusive, (B), Fractions 30–41, inclusive, (C). Each of these fractions upon evaporation of the solvent prodored crystallized material as follows:

Fraction A was recrystallized from acetone to give pure N - (trans - 4 - propyl - 1 - methyl - L - prolyl) lincosamine dibutyl mercaptal having a melting point of 110–112° C., a rotation $[\alpha]_D^{24}$ minus 11° (c., 0.5654, chloroform) and the following analysis:

*Analysis.*—Calculated for $C_{25}H_{50}N_2O_6S_2$: C, 55.73; H, 9.35; N, 5.20; S, 11.90. Found: C, 55.65; H, 9.78; N, 5.42; S, 12.06.

Fraction B was recrystallized from acetone to give the mixed mercaptal, N-(trans-4-propyl-1-methyl-L-prolyl) lincosamine methyl butyl mercaptal, as a mixture of the two diastereoisomers, melting point 120–130°; $[\alpha]_D$ minus 18° (c., 0.9046, chloroform).

*Analysis.*—Calculated for $C_{22}H_{44}N_2O_6S_2$: C, 53.19; H, 8.93; N, 5.64; S, 12.91. Found: C, 52.67; H, 8.01; N, 5.90; S, 12.87.

Fraction C consisted of the dimethyl mercaptal, namely, N-(trans-4-propyl-1-methyl-L-prolyl)lincosamine dimethyl mercaptal, identical with the material obtained in Preparation 21.

*Preparation 24.*—N-(*trans-4-ethyl-1-ethyl-methyl-L-prolyl*)*lincosamine dioctadecyl mercaptal*

In the manner given in Preparation 21, methyl N-(trans-4-ethyl-1-methyl-L-prolyl)-α-thiolincosaminide was reacted with octadecanethiol and concentrated hydrochloric acid to give N-(trans-4-ethyl-1-methyl-L-prolyl) lincosamine dioctadecyl mercaptal.

*Preparation 25.*—N-(*trans-4-octyl-1-ethyl-L-prolyl*) *lincosamine didodecyl mercaptal*

In the manner given in Preparation 21, reacting methyl N - (trans - 4 - octyl - 1 - ethyl - L - prolyl) - α - thiolincosaminide with dodecanethiol and concentrated hydrochloric acid produces N-(trans-4-octyl-1-ethyl-L-prolyl) lincosamine didodecyl mercaptal.

*Preparation 26.*—N-(*cis-4-methyl-1-octyl-D-prolyl*) *lincosamine ditetradecyl mercaptal*

In the manner given in Praparation 21, reacting methyl N - (cis - 4 - methyl - 1 - octyl - D - prolyl) - α - thiolincosaminide with tetradecanethiol and concentrated hydrochloric acid produces N-(cis-4-methyl-1-octyl-D-prolyl) lincosamine ditetradecyl mercaptal.

*Preparation 27.*—N-(*trans-4-propyl-1-methyl-L-prolyl*) *lincosamine dihexyl mercaptal*

In the manner given in Preparation 21, reacting ethyl (trans - 4 - propyl - 1 - methyl - L - prolyl) - α - thiolincosaminide with hexanethiol and concentrated hydrochloric acid produces N-(trans-4-propyl-1-methyl-L-prolyl) lincosamine dihexyl mercaptal.

*Preparation 28.*—N-(*trans-4-propyl-1-methyl-L-prolyl*) *celestosamine diundecyl mercaptal*

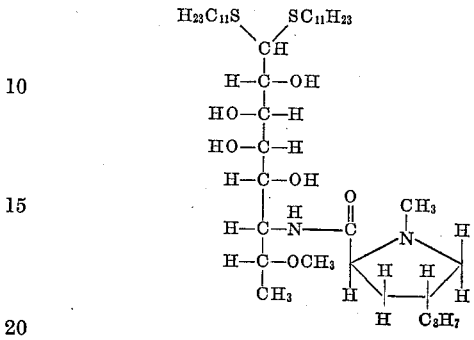

In the manner given in Preparation 21, reacting 2-hydroxyethyl N - (trans - 4 - propyl - 1 - methyl - L - prolyl-α-thiocelestosaminide with undecanethiol and concentrated hydrochloric acid produces N-(trans-4-propyl-1-methyl-L-prolyl)celestosamine diundecyl mercaptal.

*Preparation 29.*—N-(*cis-4-butyl-1-ethyl-D-prolyl*) *celestoasmine dihexyl mercaptal*

In the manner given in Preparation 21, reacting 2-hydroxyethyl N - (cis - 4 - butyl - 1 - ethyl - D - prolyl)-α-thiocelestosaminide with hexanethiol and concentrated hydrochloric acid produces N-(cis-4-butyl-1-ethyl-D-prolyl)celestosamine dihexyl mercaptal.

*Preparation 30.*—N - (*cis-4-hexyl-1-ethyl-L-prolyl*)*lincosamine di-benzyl mercaptal and a mixture of two isomeric* N-(*cis-4-hexyl-1-ethyl - L - prolyl*)*lincosamine benzyl methyl mercaptals*

In the manner given in Preparation 23, benzyl mercaptan, hydrochloric acid and methyl N-(cis-4-hexyl-1-ethyl-L-prolyl)-α-thiolincosaminide were reacted to give a mixture of products which was separated by chromatography into:

(A) N-(cis-4-hexyl-1-ethyl - L - prolyl)lincosamine dibenzyl mercaptal (B) A mixture of two N-(cis-4-hexyl-1-ethyl-L-prolyl)-lincosamine benzyl methyl mercaptals (C) A small fraction of N-(cis-4-hexyl-1-ethyl-L-prolyl)-lincosamine dimethyl mercaptal.

*Preparation 31.*—N - (*trans-4-nonyl-1-propyl-D-prolyl*)-*lincosamine ditridecyl mercaptal and a mixture of two isomeric* N-(*trans-4-nonyl-1-propyl - D - prolyl*)*lincosamine tridecyl methyl mercaptals*

In the manner given in Preparation 23, tridecyl mercaptan, hydrochloric acid and methyl N-(trans-4-nonyl-1-propyl-D-prolyl)-α-thiolincosaminide were reacted to give a mixture of products which was separated by chromatography into:

(A) N-(trans-4-nonyl-1-propyl-D-prolyl)lincosamine ditridecyl mercaptal (B) A mixture of two isomeric N-(trans - 4 - nonyl-1-propyl-D-prolyl)lincosamine tridecyl methyl mercaptals (C) A small fraction of N-(trans-4-nonyl-1-propyl-D-prolyl)lincosamine dimethyl mercaptal.

*Preparation 32.*—N-(*cis-4-heptyl-1-hexyl-D-prolyl*)*lincosamine diheptyl mercaptal and a mixture of two isomeric* N-(*cis-4-heptyl-1hexyl - D - prolyl*)*lincosamine heptyl methyl mercaptals*

In the manner given in Preparation 23, heptyl mercaptan, hydrochloric acid and methyl N-(cis-4-heptyl-1-hexyl-D-prolyl)-α-thiolincosaminide were reacted to give a mixture of products which was separated by chromatography into:

(A) N-(cis-4-heptyl-1-hexyl - D - prolyl)lincosamine diheptyl mercaptal
(B) A mixture of two isomeric N-(cis-4-heptyl-1-hexyl-D-prolyl)lincosamine heptyl methyl mercaptals
(C) A small fraction of N-(cis-4-heptyl - 1 - hexyl-D-prolyl)lincosamine dimethyl mercaptal.

*Preparation 33.*—N - (*trans-4-propyl-1-methyl-L-prolyl*)-*celestosamine dibutyl mercaptal and a mixture of two isomeric N-(trans-4-propyl-1-methyl-L-prolyl)celestosamine butyl 2-hydroxyethyl mercaptals*

In the manner given in Preparation 23, butanethiol, hydrochloric acid and 2-hydroxyethyl N-(trans-4-propyl-1-methyl-L-prolyl)-α-celestosaminide were reacted to give a mixture of products which was separated by chromatography into:

(A) N - (trans-4-propyl-1-methyl - L - prolyl)celestosamine dibutyl mercaptal
(B) A mixture of two isomeric N-(trans-4-propyl-1-methyl-L-prolyl)celestosamine butyl 2 - hydroxyethyl mercaptals
(C) A small fraction of N-(trans-4-propyl-1-methyl-L-prolyl)celestosamine bis(2-hydroxyethyl)mercaptal.

In the manner given in Preparation 21, other N-(1,4-dialkylprolyl)lincosamine mercaptals and N-(1,4-dialkylprolyl)celestosamine mercaptals can be prepared by reacting a selected methyl or ethyl N-(1,4-dialylprolyl)-α-thiolincosaminide or a 2-hydroxyethyl N-(1,4-dialkylprolyl)-α-thiocelestosaminide with an alkyl (1 to 18 carbon atoms), benzyl or 2-thenyl mercaptan in the presence of hydrochloric acid. Representative compounds thus obtained include: N-(trans-4-propyl-1-methyl - L - prolyl)-lincosamine dihexyl mercaptal, N-(trans-4-ethyl-1-methyl-L-prolyl)lincosamine dioctadecyl mercaptal, N-(trans-4 - decyl-1-butyl-L-prolyl)lincosamine dioctyl mercaptal, N-(cis-4-propyl-1-ethyl - L - prolyl)lincosamine diheptyl mecaptal, N-(trans-4-pentyl-1-decyl-D-prolyl)lincosamine didecyl mercaptal, N-(trans-4-butyl-1-methyl-L-prolyl)-lincosamine dibenzyl mercaptal, N - (trans-4-propyl-1-methyl-L-prolyl)lincosamine di-2-thenyl mercaptal, N-(trans-4-octyl-1-ethyl - L - prolyl)lincosamine didodecyl mercaptal, N-(cis-4-hexyl-1-dodecyl-L-prolyl)lincosamine dibutyl mercaptal, N-(cis-4-butyl-1-ethyl - L - prolyl)-celestosamine dibutyl mercaptal, N-(trans - 4 - heptyl-1-dodecyl - D - prolyl)celestosamine dioctyl mercaptal, N-(trans - 4 - octyl-1-methyl-D-prolyl)celestosamine di-2-thenyl mercaptal, N-(cis-4-hexyl-1-butyl - D - prolyl)-celestosamine dibenzyl mercaptal, and the like.

In the manner given in Preparation 23, other N-(1,4-dialkylprolyl)lincosamine dialkyl mercaptals of Formula I can be prepared by reacting a selected methyl or ethyl N-(1,4-dialkylprolyl)-α-thiolincosaminide or 2-hydroxyethyl N-(1,4-dialkylprolyl)-α-thiocelestosaminide with an alkyl (1 to 18 carbon atoms), benzyl or 2-thenyl mercaptan. Those dialkyl mercaptals of Formula I in which $R_1$ and $R_2$ are different have an additional asymmetric carbon atom and exist as a mixture of two diastereoisomers.

Representative compounds (in such isomer mixture) obtained as shown above include: N-(trans-4-propyl-1-methyl-L-prolyl)lincosamine methyl hexyl mercaptal; N-(trans-4-ethyl-1-methyl-L-prolyl)lincosamine methyl octadecyl mercaptal; N - (trans-4-decyl-1-butyl-L-prolyl)-lincosamine methyl octyl mercaptal; N-(cis-4-propyl-1-ethyl-L-prolyl)lincosamine methyl heptyl mercaptal; N-(trans-4-pentyl-1-decyl - D - prolyl)lincosamine methyl decyl mercaptal; N-(trans-4-butyl-1-methyl - L - prolyl)-lincosamine methyl benzyl mercaptal; N-(trans-4-propyl-1-methyl-L-prolyl)lincosamine methyl 2-thenyl mercaptal; N-(trans-4-octyl-1-ethyl-L-prolyl)lincosamine methyl dodecyl mercaptal; N-(cis-4-hexyl-1-dodecyl-L-prolyl)-lincosamine methyl butyl mercaptal; N-(cis-4-butyl-1-ethyl-L-prolyl)celestosamine methyl butyl mercaptal; N-(trans-4-heptyl-1-dodecyl-D-prolyl)celestosamine methyl octyl mercaptal; N-(trans-4-octyl-1-methyl - D - prolyl)-celestosamine methyl 2-thenyl mercaptal; N-(cis-4-hexyl-1-butyl-D-prolyl)celestosamine methyl benzyl mercaptal; and the like.

*Preparation 34.—Lincosamine dimethyl mercaptal*

A mixture of 10 g. (0.022 mole) of N-(trans-4-propyl-1-methyl-L-prolyl)lincosamine dimethyl mercaptal and 100 g. of hydrazine hydrate was heated under reflux for a period of 6 days. The hydrazine hydrate was thereupon evaporated in vacuo in a nitrogen atmosphere. The residue was crystallized from hot acetonitrile (100 ml.), yielding in two crops a total of 4.3 g. of 64% yield) of lincosamine dimethyl mercaptal. The lincosamine dimethyl mercaptal thus obtained was recrystallized from absolute ethanol, yielding pure lincosamine dimethyl mercaptal having a melting point of 142–144° C., a pKa' of 7.95 in water and an analysis as follows:

*Analysis.*—Calcd. for $C_{10}H_{23}NO_5S_2$: C, 39.84; H, 7.69; N, 4.65; S, 21.27. Found: C, 39.74; H, 7.09; N, 4.87; S, 20.54.

*Preparation 35.—Lincosamine diethyl mercaptal*

In the manner given in Preparation 34, N-(trans-4-propyl-1-methyl-L-prolyl)lincosamine diethyl mercaptal was heated with hydrazine hydrate under reflux for 8 days to give lincosamine diethyl mercaptal.

*Preparation 36.—Lincosamine dibutyl mercaptal*

In the manner given in Preparation 34, N-(trans-4-propyl-1-methyl-L-prolyl)lincosamine dibutyl mercaptal was heated with hydrazine hydrate under reflux for 8 days to give lincosamine dibutyl mercaptal.

*Preparation 37.—Lincosamine methyl butyl mercaptal*

In the manner given in Preparation 34, N-(trans-4-propyl-1-methyl-L-prolyl)lincosamine methyl butyl mercaptal was heated with hydrazine hydrate under reflux for 8 days to give lincosamine methyl butyl mercaptal as a mixture of two diastereoisomers.

*Preparation 38.—Lincosamine dioctadecyl mercaptal*

In the manner given in Preparation 34, N-(trans-4-ethyl-1-methyl-L-prolyl)lincosamine dioctadecyl mercaptal was heated with hydrazine hydrate under reflux for 8 days to give lincosamine dioctadecyl mercaptal.

*Preparation 39.—Lincosamine didodecyl mercaptal*

In the manner given in Preparation 34, N-(trans-4-octyl-1-ethyl-L-prolyl)lincosamine didodecyl mercaptal was heated with hydrazine hydrate under reflux for 8 days to give lincosamine didodecyl mercaptal.

*Preparation 40.—Lincosamine ditetradecyl mercaptal*

In the manner given in Preparation 34, N-(cis-4-methyl-1-octyl-D-prolyl)lincosamine ditetradecyl mercaptal was heated with hydrazine hydrate under reflux for 8 days to give lincosamine ditetradecyl mercaptal.

*Preparation 41.—Celestosamine diundecyl mercaptal*

In the manner given in Preparation 34, N-(trans-4-propyl-1-methyl-L-prolyl)celestosamine diundecyl mercaptal was heated with hydrazine hydrate under reflux for 8 days to give celestosamine diundecyl mercaptal.

*Preparation 42.—Celestosamine dihexyl mercaptal*

In the manner given in Preparation 34, N-(cis-4-butyl-1-ethyl-D-prolyl)celestosamine dihexyl mercaptal was heated with hydrazine hydrate under reflux for 8 days to give celestosamine dihexyl mercaptal.

Preparation 43.—Lincosamine dibenzyl mercaptal

In the manner given in Preparation 34, N-(cis-4-hexyl-1-ethyl-L-prolyl)lincosamine dibenzyl mercaptal was heated with hydrazine hydrate under reflux for 8 days to give lincosamine dibenzyl mercaptal.

Preparation 44.—Lincosamine benzyl methyl mercaptal

In the manner given in Preparation 34, N-(cis-4-hexyl-1-ethyl-L-prolyl)lincosamine benzyl methyl mercaptal was heated with hydrazine hydrate under reflux for 8 days to give lincosamine benzyl methyl mercaptal as a mixture of two diastereoisomers.

Preparation 45.—Lincosamine tridecyl mercaptal

In the manner given in Preparation 34, N-(trans-4-nonyl-1-propyl-D-prolyl)lincosamine tridecyl mercaptal was heated with hydrazine hydrate under reflux for 8 days to give lincosamine tridecyl mercaptal.

Preparation 46.—Lincosamine tridecyl methyl mercaptal

In the manner given in Preparation 34, N-(trans-4-nonyl-1-propyl-D-prolyl)lincosamine tridecyl methyl mercaptal was heated with hydrazine hydrate under reflux for 8 days to give lincosamine tridecyl methyl mercaptal.

Preparation 47.—Lincosamine diheptyl mercaptal

In the manner given in Preparation 34, N-(cis-4-heptyl-1-hexyl-D-prolyl)lincosamine diheptyl mercaptal was heated with hydrazine hydrate under reflux for 8 days give lincosamine diheptyl mercaptal.

Preparation 48.—Lincosamine heptyl methyl mercaptal

In the manner given in Preparation 34, N-(cis-4-heptyl-1-hexyl-D-prolyl)lincosamine heptyl methyl mercaptal was heated with hydrazine hydrate under reflux for 8 days to give lincosamine heptyl methyl mercaptal as a mixture of two diastereoisomers.

Preparation 49.—Celestosamine dibutyl mercaptal

In the manner given in Preparation 34, N-(trans-4-propyl-1-methyl-L-prolyl)celestosamine dibutyl mercaptal was heated with hydrazine hydrate under reflux for 8 days to give celestosamine dibutyl mercaptal.

Preparation 50.—Celestosamine butyl methyl mercaptal

In the manner given in Preparation 34, N-(trans-4-propyl-1-methyl-L-prolyl)celestosamine butyl methyl mercaptal was heated with hydrazine hydrate under reflux for 8 days to give celestosamine butyl methyl mercaptal as a mixture of two diastereoisomers.

Preparation 51.—Lincosamine dihexyl mercaptal

In the manner given in Preparation 34, N-(trans-4-propyl-1-methyl-L-prolyl)lincosamine dihexyl mercaptal was heated with hydrazine hydrate under reflux for 8 days to give lincosamine dihexyl mercaptal.

Preparation 52.—Lincosamine di-2-thenyl mercaptal

In the manner given in Preparation 34, N-(trans-4-ethyl-1-methyl-D-prolyl)lincosamine di-2-thenyl mercaptal was heated with hydrazine hydrate under reflux for 8 days to give lincosamine di-2-thenyl mercaptal.

Preparation 53.—Lincosamine dibenzyl mercaptal

In the manner given in Preparation 34, N-(cis-4-decyl-1-dodecyl-L-prolyl)lincosamine dibenzyl mercaptal was heated with hydrazine hydrate under reflux for 8 days to give lincosamine dibenzyl mercaptal.

Preparation 54.—Celestosamine dibenzyl mercaptal

In the manner given in Preparation 34, N-(cis-4-octyl-1-decyl-L-prolyl)celestosamine dibenzyl mercaptal was heated with hydrazine hydrate under reflux for 8 days to give celestosamine dibenzyl mercaptal.

Preparation 55.—Celestosamine di-2-thenyl mercaptal

In the manner given in Preparation 34, N-(trans-4-propyl-1-methyl-L-prolyl)celestosamine di-2-thenyl mercaptal was heated with hydrazine hydrate under reflux for 8 days to give celestosamine di-2-thenyl mercaptal.

Preparation 56.—Celestosamine dimethyl mercaptal

In the manner given in Preparation 34, N-(trans-4-propyl-1-methyl-L-prolyl)celestosamine dimethyl mercaptal was heated with hydrazine hydrate under reflux for 8 days to give celestosamine dimethyl mercaptal.

In the manner given in Preparation 34, other mercaptals of Formula I can be prepared by heating under reflux with hydrazine hydrate other mercaptals of N-(1,4-dialkylprolyl) lincosamine or N-(1,4-dialkylprolyl)celestosamine. Representative compounds thus obtained include: lincosamine dipentyl mercaptal, lincosamine dioctyl mercaptal, lincosamine dinonyl mercaptal, lincosamine didecyl mercaptal, lincosamine dipentadecyl mercaptal, lincosamine dihexadecyl mercaptal, lincosamine diheptadecyl mercaptal, celestosamine dibutyl mercaptal, celestosamine dioctyl mercaptal, celestosamine dioctadecyl mercaptal, celestosamine diheptyl mercaptal, celestosamine ditetradecyl mercaptal, lincosamine methyl hexyl mercaptal, lincosamine methyl octadecyl mercaptal, lincosamine methyl octyl mercaptal, lincosamine methyl benzyl mercaptal, lincosamine methyl 2-thenyl mercaptal, lincosamine methyl decyl mercaptal, celestosamine methyl butyl mercaptal, celestosamine methyl octyl mercaptal, celestosamine methyl decyl mercaptal, celestosamine methy 2-thenyl mercaptal, celestosamine methyl benzyl mercaptal, and the like.

Example 1.—N-(2,4-dinitrophenyl)lincosamine dimethyl mercaptal

To 1 g. (0.0033 mole) of lincosamine dimethyl mercaptal in 20 ml. of 50% aqueous ethanol was added 0.5 g. of sodium bicarbonate and 1 g. (0.0054 mole) of 1-fluoro-2,4-dinitrobenzene in 10 ml. of ethanol. After 2 hours of stirring at room temperature, about 24–26° C., the mixture was evaporated to dryness to give a residue. After extracting the residue with 50 ml. of benzene, which was then discarded, and washing it twice with 25 ml. portions of water, 1.2 g. of yellow solid remained. Recrystallization of the solid from boiling acetone gave 820 mg. of N-(2,4-dinitrophenyl)lincosamine dimethyl mercaptal in the form of yellow crystals melting at 138–140° C. with decomposition and having the following analysis:

Analysis.—Calcd. for $C_{16}H_{25}N_3O_9S_2$: C, 41.10; H, 5.39; N, 8.99; S, 13.72. Found: C, 41.12; H, 5.38; N, 6.69; S, 13.33.

Example 2.—N-(2,4-dinitrophenyl)lincosamine diethyl mercaptal

In the manner given in Example 1, lincosamine diethyl mercaptal in aqueous ethanol was reacted with 1-fluoro-2,4-dinitrobenzene in the presence of sodium bicarbonate to give N-(2,4-dinitrophenyl)lincosamine diethyl mercaptal.

Example 3.—N-(2,4-dinitrophenyl)lincosamine dibutyl mercaptal

In the manner given in Example 1, lincosamine dibutyl mercaptal in aqueous ethanol was reacted with 1-fluoro-2,4-dintrobenzene in the presence of sodium bicarbonate to give N-(2,4-dinitrophenyl)lincosamine dibutyl mercaptal.

Example 4.—N-(2,4-dinitrophenyl)lincosamine methyl butyl mercaptal

In the manner given in Example I, (lincosamine methyl butyl mercaptal in aqueous ethanol was reacted with 1-fluoro-2,4-dinitrobenzene in the presence of sodium bicarbonate to give N-(2,4-dinitrophenyl)lincosamine methyl butyl mercaptal.

Example 5.—N-(2,4-dinitrophenyl)lincosamine dioctadecyl mercaptal

In the manner given in Example 1, lincosamine dioctadecyl mercaptal in aqueous ethanol was reacted with 1-fluoro-2,4-dinitrobenzene in the presence of sodium bicarbonate to give N-(2,4-dinitrophenyl)lincosamine diactadecyl mercaptal.

Example 6.—N-(2,4-dinitrophenyl)lincosamine didodecyl mercaptal

In the manner given in Example 1, lincosamine didodecyl mercaptal in aqueous ethanol was reacted with 1-fluoro-2,4-dinitrobenzene in the presence of sodium bicarbonate to give N-(2,4-dinitrophenyl)lincosamine didodecyl mercaptal.

Example 7.—N-(2,4-dinitrophenyl)lincosamine ditetradecyl mercaptal

In the manner given in Example 1, lincosamine ditetradecyl mercaptal in aqueous ethanol was reacted with 1-fluoro-2,4-dinitrobenzene in the presence of sodium bicarbonate to give N-(2,4-dinitrophenyl)lincosamine ditetradecyl mercaptal.

Example 8.—N-(2,4-dinitrophenyl)celestosamine diundecyl mercaptal

In the manner given in Example 1, celestosamine diundecyl mercaptal in aqueous ethanol was reacted with 1-fluoro-2,4-dinitrobenzene in the presence of sodium bicarbonate to give N-(2,4-dinitrophenyl)celestosamine diundecyl mercaptal.

Example 9.—N-(2,4-dinitrophenyl)celestosamine dihexyl mercaptal

In the manner given in Example 1, celestosamine dihexyl mercaptal in aqueous ethanol was reacted with 1-fluoro-2,4-dinitrobenzene in the presence of sodium bicarbonate to give N-(2,4-dinitrophenyl)celestosamine dihexyl mercaptal.

Example 10.—N-(2,4-dinitrophenyl)lincosamine dibenzyl mercaptal

In the manner given in Example 1, lincosamine dibenzyl mercaptal in aqueous ethanol was reacted with 1-fluoro-2,4-dinitrobenzene in the presence of sodium bicarbonate to give N-(2,4-dinitrophenyl)lincosamine dibenzyl mercaptal.

Example 11.—N-(2,4-dinitrophenyl)lincosamine benzyl methyl mercaptal

In the manner given in Example 1, lincosamine benzyl methyl mercaptal in aqueous 1-propanol was reacted with 1-fluoro-2,4-dinitrobenzene in the presence of sodium bicarbonate to give N-(2,4-dinitrophenyl)lincosamine benzyl methyl mercaptal.

Example 12.—N-(2,4-dinitrophenyl)lincosamine ditridecyl mercaptal

In the manner given in Example 1, lincosamine ditridecyl mercaptal in aqueous 1-propanol was reacted with 1-flluoro-2,4-dinitrobenzene in the presence of sodium bicarbonate to give N-(2,4-dinitrophenyl)lincosamine ditridecyl mercaptal.

Example 13.—N-(2,4-dinitrophenyl)lincosamine tridecyl methyl marcaptal

In the manner given in Example 1, lincosamine tridecyl methyl mercaptal in aqueous 2-propanol was reacted with 1-fluoro-2,4-dinitrobenzene in the presence of sodium bicarbonate to give N-(2,4-dinitrophenyl)lincosamine tridecyl methyl mercaptal.

Example 14.—N-(2,4-dinitrophenyl)lincosamine diheptyl mercaptal

In the manner given in Example 1, lincosamine diheptyl mercaptal in aqueous ethanol was reacted with 1-fluoro-2,4-dinitrobenzene in the presence of sodium bicarbonate to give N-(2,4-dinitrophenyl)lincosamine diheptyl mercaptal.

Example 15.—N-(2,4-dinitrophenyl)lincosamine heptyl methyl mercaptal

In the manner given in Example 1, (lincosamine heptyl methyl mercaptal in aqueous ethanol was reacted with 1-fluoro-2,4-dinitrobenzene in the presence of potassium bicarbonate to give N-(2,4-dinitrophenyl)lincosamine heptyl methyl mercaptal.

Example 16.—N-(2,4-dinitrophenyl)celestosamine dibutyl mercaptal

In the manner given in Example 1, celestosamine dibutyl mercaptal in aqueous ethanol was reacted with 1-fluoro-2,4-dinitrobenzene in the presence of potassium bicarbonate to give N-(2,4-dinitrophenyl)celestosamine dibutyl mercaptal.

Example 17.—N-(2,4-dinitrophenyl)celestosamine butyl methyl mercaptal

In the manner given in Example 1, celestosamine butyl methyl mercaptal in aqueous ethanol was reacted with 1-fluoro-2,4-dinitrobenzene in the presence of potassium bicarbonate to give N-(2,4-dinitrophenyl)celestosamine butyl methyl mercaptal.

Example 18.—N-(2,4-dinitrophenyl)lincosamine dihexyl mercaptal

In a manner given in Example 1, lincosamine dihexyl mercaptal in aqueous methanol was reacted with 1-fluoro-2,4-dintrobenzene in the presence of potassium bicarbonate to give N-(2,4-dinitrophenyl)lincosamine dihexyl mercaptal.

Example 19.—N-(2,4-dinitrophenyl)lincosamine di-2-thenyl mercaptal

In the manner given in Example 1, lincosamine di-2-thenyl mercaptal in aqueous ethanol was reacted with 1-fluoro-2,4-dinitrobenzene in the presence of sodium bicarbonate to give N-(2,4-dinitrophenyl)lincosamine di-2-thenyl mercaptal.

Example 20.—N-(2,4-dinitrophenyl)lincosamine dibenzyl mercaptal

In the manner given in Example 1, lincosamine dibenzyl mercaptal in aqueous ethanol was reacted with 1-fluoro-2,4-dinitrobenzene in the presence of sodium bicarbonate to give N-(2,4-dinitrophenyl)lincosamine dibenzyl mercaptal.

Example 21.—N-(2,4-dinitrophenyl)celestosamine dibenzyl mercaptal

In the manner given in Example 1, celestosamine dibenzyl mercaptal in aqueous ethanol was reacted with 1-fluoro-2,4-dinitrobenzene in the presence of sodium bicarbonate to give N-(2,4-dinitrophenyl)celestosamine dibenzyl mercaptal.

Example 22.—N-(2,4-dinitrophenyl)celestosamine di-2-thenyl mercaptal

In the manner given in Example 1, celestosamine di-2-thenyl mercaptal in aqueous ethanol was reacted with 1-fluoro-2,4-dinitrobenzene in the presence of lithium bicarbonate to give N-(2,4-dinitrophenyl)celestosamine di-2-thenyl mercaptal.

Example 23.—N-(2,4-dinitrophenyl)celestosamine dimethyl mercaptal

In the manner given in Example 1, celestosamine dimethyl mercaptal in aqueous ethanol was reacted with 1- fluoro-2,4-dinitrobenzene in the presence of lithium bicarbonate to give N-(2,4-dinitrophenyl)celestosamine dimethyl mercaptal.

In the manner given in Example 1, other N-(2,4-dinitrophenyl)lincosamine mercaptals and N-(2,4-dinitrophenyl)celestosamine mercaptals are obtained by reacting a selected lincosamine mercaptal or celestosamine mercaptal with 1-fluoro-2,4-dinitrobenzene in a lower alcohol solution and in the presence of a base capable of accepting hydrogen fluoride. Representative compounds thus obtained include: N-(2,4-dinitrophenyl)lincosamine dipentyl mercaptal, N-(2,4-dinitrophenyl)lincosamine dioctyl mercaptal, N-(2,4-dinitrophenyl)lincosamine dinonyl mercaptal, N-(2,4-dinitrophenyl)lincosamine dipentadecyl mercaptal, N-(2,4-dinitrophenyl)lincosamine didecyl mercaptal, N-(2,4-dinitrophenyl)lincosamine dihexadecyl mercaptal, N-(2,4-dinitrophenyl)lincosamine diheptadecyl mercaptal, N-(2,4-dinitrophenyl)celestosamine dibutyl mercaptal, N-(2,4-dinitrophenyl)celestosamine dioctyl mercaptal, N-(2,4-dinitrophenyl)celestosamine dioctadecyl mercaptal, N-(2,4-dinitrophenyl)celestosamine diheptyl mercaptal, N-(2,4-dinitrophenyl)celestosamine ditetradecyl mercaptal, N-(2,4-dinitrophenyl)lincosamine methyl hexyl mercaptal, N-(2,4-dinitrophenyl)lincosamine methyl octadecylmercaptal, N-(2,4-dinitrophenyl)lincosamine methyl octyl mercaptal, N-(2,4-dinitrophenyl)lincosamine methyl benzyl mercaptal, N-(2,4-dinitrophenyl)lincosamine methyl 2-thenyl mercaptal, N-(2,4-dinitrophenyl)lincosamine methyl decyl mercaptal, N-(2,4-dinitrophenyl)celestosamine methyl butyl mercaptal, N-(2,4-dinitrophenyl)celestosamine methyl ethyl mercaptal, N-(2,4-dinitrophenyl)celestosamine methyl decyl mercaptal, N-(2,4-dinitrophenyl)celestosamine methyl 2-thenyl mercaptal, N-(2,4-dinitrophenyl)celestosamine methyl benzyl mercaptal and the like.

I claim:
1. A compound of the formula:

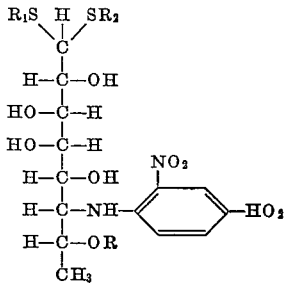

wherein R is selected from the group consisting of hydrogen and methyl, wherein $R_1$ and $R_2$ are selected from the group consisting of alkyl radicals having from 1 to 18 carbon atoms, inclusive and benzyl and 2-thenyl.

2. N-(2,4-dinitrophenyl)lincosamine dimethyl mercaptal having the following formula:

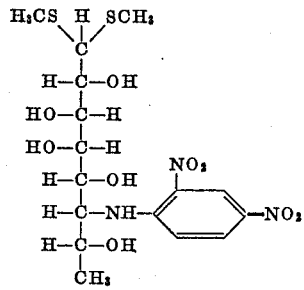

3. N-(2,4-dinitrophenyl)celestosamine dimethyl mercaptal having the following formula:

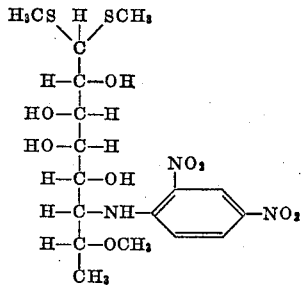

4. N-(2,4-dinitrophenyl)lincosamine dibutyl mercaptal.

References Cited

UNITED STATES PATENTS

| | | | |
|---|---|---|---|
| 3,037,015 | 5/1962 | Rudy et al. | 260—211 |
| 3,242,162 | 3/1966 | Sarett et al. | 260—211 |
| 3,255,179 | 6/1966 | Schroeder | 260—210 |

LEWIS GOTTS, *Primary Examiner.*

J. R. BROWN, *Assistant Examiner.*